United States Patent [19]

Murakami et al.

[11] 4,185,954
[45] Jan. 29, 1980

[54] DIE FOR EXTRUDING TUBES COMPOSED OF A PLURALITY OF LAYERS

[75] Inventors: Kenkichi Murakami, Osaka; Yoshiharu Kikuzawa, Takarazuka, both of Japan

[73] Assignee: Kabushiki Kaisha Plastic Kogaku Kenkyusho, Osaka, Japan

[21] Appl. No.: 827,014

[22] Filed: Aug. 23, 1977

[51] Int. Cl.² ............................................. B29D 23/04
[52] U.S. Cl. ................................. 425/462; 425/133.1; 425/466; 425/467
[58] Field of Search ..................... 425/133.1, 380, 462, 425/381, 466, 376 A, 467

[56] References Cited

U.S. PATENT DOCUMENTS 3,649,143  3/1972  Papesh et al. ................. 425/133.1 X

FOREIGN PATENT DOCUMENTS 2508919  9/1976  Fed. Rep. of Germany ........ 425/133.1

Primary Examiner—Mark Rosenbaum
Attorney, Agent, or Firm—Armstrong, Nikaido, Marmelstein & Kubovcik

[57] ABSTRACT

A die comprising a central core and at least two thickness adjusting rings surrounding the core concentrically therewith and providing a resin passage between the core and the inner thickness adjusting ring and another resin passage between the inner and outer thickness adjusting rings, each of the rings having a planar seat surface. The rings are joined at their seat surfaces to the core, or alternatively, the inner ring is joined to the core and the outer ring to the inner ring similarly, whereby the rings are rendered radially shiftable for adjustment. Each of the resin passages is provided with resin inlets positioned substantially at the same level as the corresponding planar seat surface.

1 Claim, 7 Drawing Figures

DIE FOR EXTRUDING TUBES COMPOSED OF A PLURALITY OF LAYERS

BACKGROUND OF THE INVENTION

The present invention relates to a novel die for extruding tubes composed of a plurality of layers, and more particularly to a die comprising a core and thickness adjusting rings joined at their planar seat surfaces to the core or a thickness adjusting ring joined at its planar seat surface to the core and at least one thickness adjusting ring similarly joined to the ring, the die including resin passages each having resin inlets positioned substantially at the same level as the corresponding planar seat surfaces. The die is easy and inexpensive to make and capable of extruding resin into a tube of a plurality of layers free of any stagnation of the resin flow.

Extrusion dies for the manufacture of tubes composed of a plurality of layers are known which comprise a core and thickness adjusting rings joined to the core each at its spherical seat surface and turnable about the axis of the spherical surface to adjust the clearances at inlet portions of resin passages between the core and the adjacent ring and between the rings. Dies of this type are disclosed for example in Japanese Patent Application Disclosures No. 23461/1972 and No. 73463/1973.

However, it is very difficult to form the spherical seat surface with high accuracy, while it is almost impossible to ascertain during the machining of the parts whether the spherical surface being made is fittable to the counterpart with uniform contact. Accordingly, the formation of the spherical seat surface requires a troublesome procedure in which the parts to be joined together are repeatedly fitted and rubbed together to ensure uniform contact therebetween.

SUMMARY OF THE INVENTION

An object of this invention is to provide a die for extruding tubes of a plurality of layers which is easy and inexpensive to make and also easy to adjust.

Another object of this invention is to provide an extrusion die for the manufacture of such tubes in which stagnation of the resin flow can be eliminated or minimized in the vicinity of resin inlets.

Other objects of this invention will become apparent form the following description and the accompanying drawings.

The die of this invention comprises a central core and thickness adjusting rings surrounding the core concentrically therewith. The thickness adjusting rings are all joined to the core at their planar seat surfaces. Alternatively, the ring adjacent the core is joined thereto at its planar seat surface, and the rings are similarly joined to one another. The planar seat surfaces render the rings radially shiftable for the adjustment of the clearance providing a resin passage between each two adjacent parts. The clearance, namely the resin passage permitting the radial adjustment is provided with resin inlets which are opened substantially at the same level as the corresponding seat surface so as to eliminate stagnation of the resin flow in the vicinity of the inlets.

DETAILED DESCRIPTION OF THE INVENTION

Figure 1:
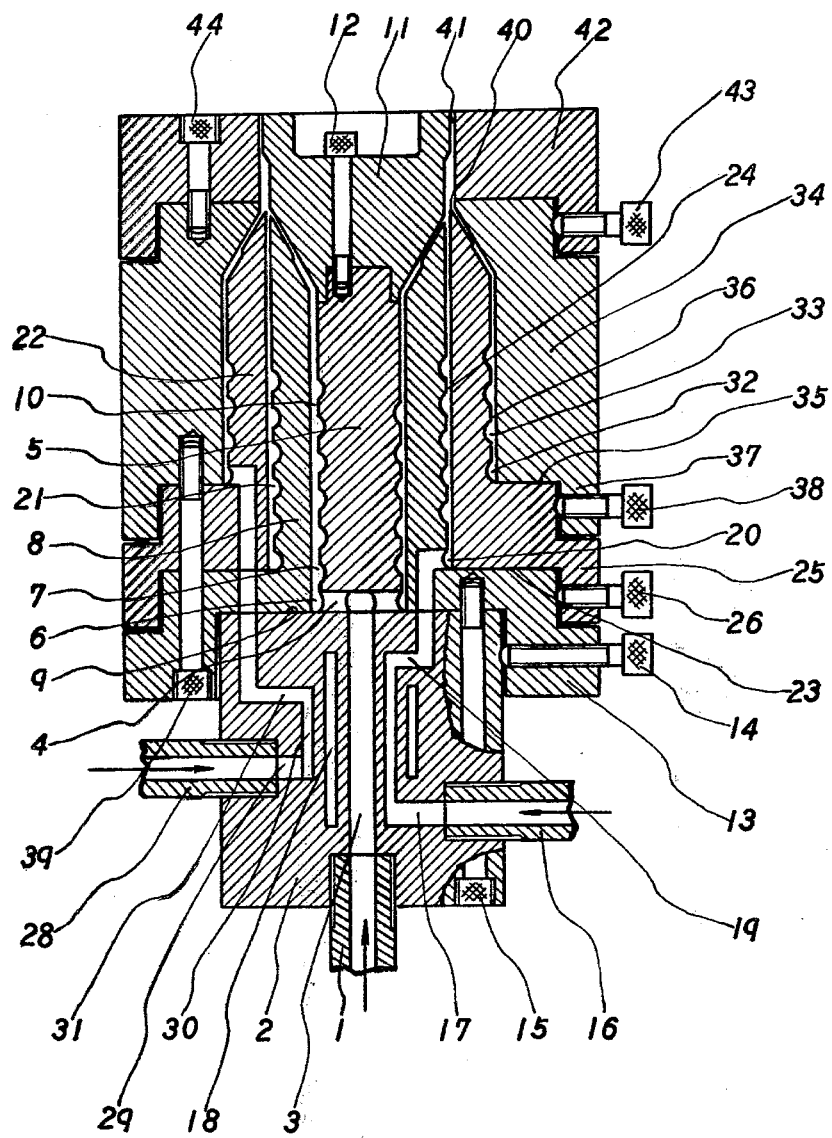
FIG. 1 is a view in vertical section showing a die for extruding tubes of a plurality of layers embodying this invention.

Embodiments of this invention will be described below in greater detail with reference to the drawings. Throughout the drawings, like parts are referred to by like reference numerals.

FIG. 1 shows the front end 1 of an adaptor connecting an unillustrated first extruder to a die by way of a die head. Indicated at 2 is the base portion of a core 5, at the lower end of which resin flows into a channel 3 for an inner layer and then flows out radially from radial bores 4. Inlets 6 for feeding the inner layer resin are provided at the outlets of the radial bores 4.

The core 5 is formed in its outer peripheral surface with helical grooves 7. The outside diameter of the core 5 progressively reduces toward the upper end of the die. Similarly the depth of the grooves progressively reduces. A first thickness adjusting ring 8 surrounds the core 5 concentrically therewith. The first ring 8 has on its bottom a planar seat surface 9 joined to the upper surface of the bore base portion 2. The lowermost portion of each inlet 6 is positioned at the same level as the seat surface 9. A passage 10 for the inner layer resin is formed between the outer peripheral surface of the core 5 and the inner peripheral surface of the first ring 8.

Since the core 5 is tapered toward its upper end, the passage 10 is so adapted that the amount of helical flow of resin through the grooves decreases while the amount of axial flow of resin increases toward the upper end. A core cap 11 fitting to the top of the core 5 is fastened to the core 5 by a bolt 12.

The first thickness adjusting ring 8 includes in its lower portion a base portion 13 provided with a plurality of adjusting bolts 14 extending radially therethrough and equidistantly arranged along the periphery of the base portion 13. The ring 8 is radially shiftable for the adjustment of its position relative to the core 5 by loosening or tightening up the bolts 14. Thus the radial width of the passage 10 is adjustable to a uniform dimension. The base portion 13 of the first ring 8 is fastened to the core base portion 2 by a bolt 15.

Indicated at 16 is the front end of an adaptor connecting an unillustrated second extruder to the die by way of the die head. The resin introduced into the right side of the core base portion 2 flows through a channel 17 for an intermediate layer into an annular portion 18, from which the resin flows through a plurality of radial bores 19 to inlets 20 provided at the outlets of the bores 19 for feeding the intermediate layer resin.

The first thickness adjusting ring 8 is formed in its outer peripheral surface with helical grooves 21. The outside diameter of the ring 8 as well as the depth of the grooves 21 progressively reduces toward the upper end of the die. A second thickness adjusting ring 22 surrounds the first ring 8 concentrically therewith. The second ring 22 has on its bottom a planar seat surface 23 joined to the upper surface of the base portion 13 of the first ring 8. The lowermost portion of each inlet 20 is positioned at the same level as the planar seat surface 23. The outer peripheral surface of the first ring 8 and the inner peripheral surface of the second ring 22 define therebetween a passage 24 for the intermediate layer resin.

Figure 2:
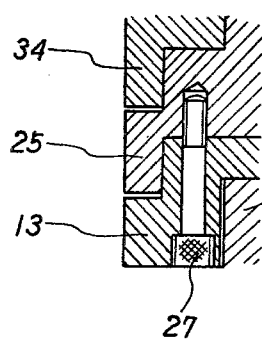
FIG. 2 is a fragmentary view in vertical section showing the base portion of a second thickness adjusting ring as connected to the base portion of a first thickness adjusting ring.

The second thickness adjusting ring 22 includes in its lower portion a base portion 25 provided with a plurality of adjusting bolts 26 extending radially therethrough and equidistantly arranged along the periphery of the base portion 25. The ring 22 is radially shiftable for the adjustment of its porition relative to the ring 8 by loosening or tightening up the bolts 26, whereby the radial width of the passage 24 is adjustable to a uniform dimension. As shown in FIG. 2, the base portion 25 of the second ring 22 is fastened to the base portion 13 of the first ring 8 by a bolt 27.

Indicated at 28 is the front end of an adaptor connecting an unillustrated third extruder to the die by way of the die head. The resin introduced into the left side of the core base portion 2 flows through a channel 29 for an outer layer into an annular portion 30, from which the resin flows through a plurality of radial bores 31 to inlets 32 provided at the outlets of the bores 31 for feeding the outer layer resin.

The second thickness adjusting ring 22 is formed in its outer peripheral surface with helical grooves 33. The outside diameter of the ring 22 as well as the depth of the grooves 33 progressively reduces toward the upper end of the die. An outer thickness adjusting ring 34 surrounds the second ring 22 concentrically therewith. The outer ring 34 has on its bottom a planar seat surface 35 joined to the upper surface of the base portion 25 of the second ring 22. The lowermost portion of each inlet 32 is positioned at the same level as the planar seat surface 35. The outer peripheral surface of the second ring 22 and the inner peripheral surface of the outer ring 34 define therebetween a passage 36 for the outer layer resin.

The outer thickness adjusting ring 34 includes in its lower portion a base portion 37 provided with a plurality of adjusting bolts 38 extending radially therethrough and equidistantly arranged along the periphery of the base portion 37. The position of the outer ring 34 is radially adjustable relative to the second ring 22 by loosening or tightening up the bolts 38, whereby the radial width of the passage 36 is adjustable to a uniform dimension. The base portion 37 of the outer ring 34 is firmly fastened to the second ring base portion 25 and to the first ring base portion 13 secured thereto, by a bolt 39 extending through the second ring base portion 25.

The passages 10, 24 and 36 join together at a junction 40, downstream of which the combined resin flows through the die and is run off from a die orifice 41.

A die ring 42 defines the outer periphery of the orifice 41. The die ring 42 is provided with a plurality of adjusting bolts 43 extending radially therethrough and arranged at equal spacing along the circumference of the die ring 42. The radial clearance between the core cap 11 and the die ring 42 is adjustable to a uniform dimension by loosening or tightening up the bolts 43. A bolt 44 fastens the die ring 42 to the outer thickness adjusting ring 34.

As already stated, the inlets of the resin passages 10, 24 and 36 are opened substantially at the same level as the planar seat surfaces 9, 23 and 35 respectively.

Figure 3:
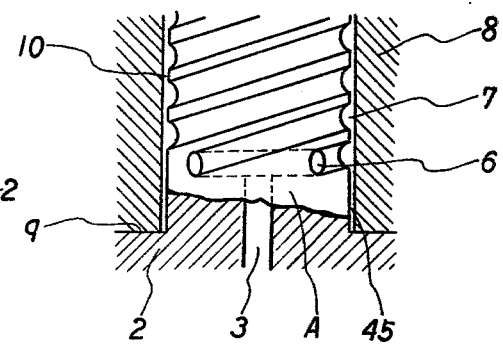
FIG. 3 is a fragmentary view partly in vertical section showing resin inlets for a resin passage in a conventional die.

FIG. 3 shows a structure according to the prior art. With the prior art structure, the clearance 45 between the core (or a thickness adjusting ring) and the adjacent ring surrounding the core below the position of the helical groove is usually made so small as to substantially prevent inflow of the resin into the clearance.

According to the present invention, the contact between the seat surface (as at 9) and the underlying surface (e.g. the upper surface of the core base portion 2) confines the resin flow. Further for the adjustment of the thickness of the resin passage between to parts, the outer surrounding ring must be radially shiftable. This requires a relatively large clearance therebetween.

When a relatively large clearance is provided below the helical groove for this purpose, a structure in which the resin inlet (as at 6) for a resin passage (as at 10) is positioned away from the planar seat surface as seen in FIG. 3 will involve a wide dead region A in which resin, when flowing in, is confined, undergoing decomposition by being subjected to high temperature for a prolonged time period.

Figure 4:
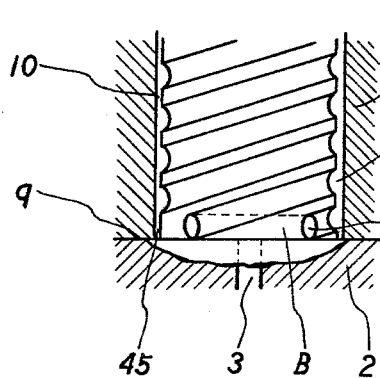
FIGS. 4 to 6 are fragmentary views partly in vertical section corresponding to FIG. 3 and showing different embodiments of this invention.

FIG. 4 shows an arrangement embodying this invention and including resin inlets for a resin passage. The resin inlets 6 are open substantially at the same level as the planar seat surface 9, and the helical grooves 7 extend immediately from the inlets. The triangular dead region B, although involved in this arrangement, is much smaller than like part of FIG. 3.

Figure 5:
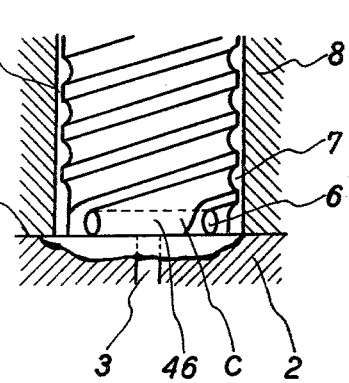

FIG. 5 shows another arrangement in which the part of the dead region in FIG. 4 has been cut out to provide a recess 46 in communication with the groove. Thus the dead region of FIG. 4 has been further reduced, but the part C greatly reduces the flow velocity of resin.

Figure 6:
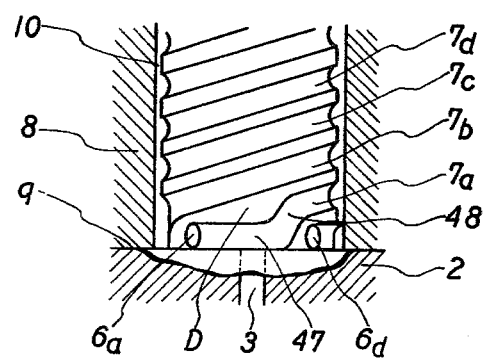

FIG. 6 shows still another arrangement in which resin inlets 6a and 6d are positioned substantially at the same level as the seat surface 9. A circular arc groove 47 of constant cross sectional area extends from each of the resin inlets and communicates with a helical groove as at 7 a via an upstanding groove 48 provided close to and partially surrounding another resin inlet as at 6d. The clearance portion D positioned between the groove 47 and the helical groove 7b will not be a dead region since the resin flow upward therethrough at all times. Thus, this arrangement is substantially free of any dead region.

As will be apparent from the above description given with reference to FIGS. 5 and 6, the dead region can be favorably eliminated by a structure in which a groove extending from an inlet toward another inlet is positioned substantially at the same level as the planar seat surface, with an upstanding groove keeping this groove in communication with a helical groove.

Although FIGS. 3 to 6 illustrate the structure involving the inner layer resin passage and inlets therefor, the same structure as described above is of course applicable to the passages for the intermediate layer resin and outer layer resin and inlets therefor.

Figure 7:
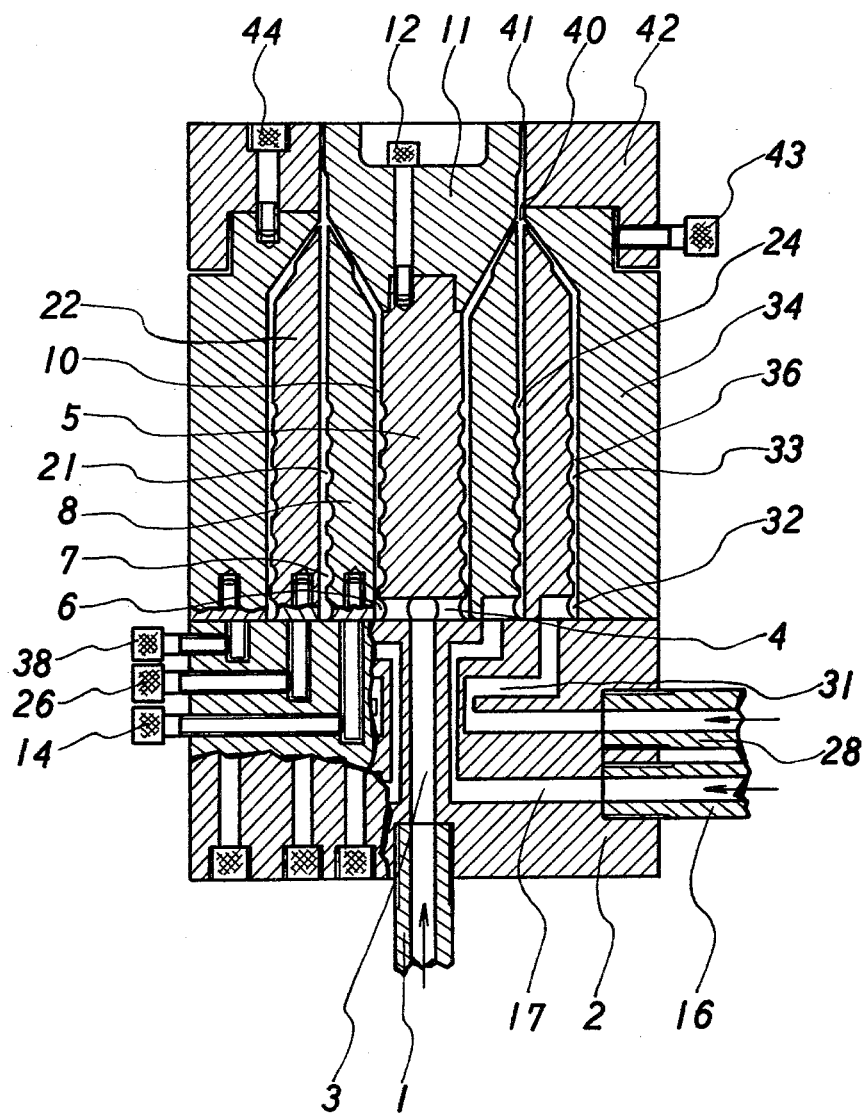
FIG. 7 is a view in vertical section showing another embodiment of this invention for the manufacture of tubes of a plurality of layers.

According to the first embodiment of this invention, the thickness adjusting ring adjacent the core is joined thereto at its planar seat surface, and each two adjacent thickness adjusting rings are joined to one another at the planar seat surface of the inner ring. However, this invention is not limited to this mode of junction. At least two or more thickness adjusting rings may be joined directly to the core at their planar seat surfaces (see FIG. 7). In this case, the rings are made radially shiftable for the adjustment of their position relative to the core.

Although the foregoing embodiments have been described as designed for the manufacture of three-layer tubes for illustrative purposes, this invention is not limited to such tubes but is applicable to tubes composed of a different number of layers. Furthermore, the constituent layers, which are joined together within the die in the foregoing description, can be joined together outside the die.

The extrusion die of this invention for the manufacture of tubes of a plurality of layers comprises a core and thickness adjusting rings joined to the core at their planar seat surfaces or a thickness adjusting ring similarly joined to the core and at least one thickness adjusting ring joined to the ring at the planar seat surface of the outer ring. Accordingly the die of this invention is much easier and less expensive to make than those involving spherical seat surfaces, further permitting easy adjustment of the clearance. Since the inlets for the resin passages are positioned substantially at the same level as the corresponding planar seat surfaces respectively, the die involves substantially no dead region and is therefore well-suited to the extrusion of resins which would be adversely affected when stagnant.

What is claimed is:

1. A die for extruding a tube composed of a plurality of layers said die comprising:

(a) a central core having a helical groove on the outer surface thereof;
(b) at least two thickness adjusting rings surrounding the core and concentric therewith, each of said thickness adjusting rings having a planar seat surface and a helical groove on the outer surface thereof, the inner of said at least two thickness adjusting rings being fixed to said core at the planar seat surface thereof and a second of said at least two thickness adjusting rings being fixed to the inner thickness adjusting ring at the planar seat surface of the second thickness adjusting ring;
(c) resin passages formed between the helical groove in the outer surface of said core and the inner surface of the adjacent thickness adjusting ring and between the helical groove on the outer surface of each of said thickness adjusting ring and the inner surface of the adjacent thickness adjusting ring; and
(d) at least two inlets opening into each of said resin passages, said inlet openings opening into said resin passages at the level of said planar seat surfaces and in a direction parallel to the planar seat surfaces wherein said die includes circular arc grooves of constant cross-sectional area, formed in the outer surfaces of said core and said thickness adjusting rings, each of said circular arc grooves being adjacent to and in communication with one of said inlets; and a connection groove extending from each of said circular arc grooves to said helical groove at a point adjacent to another of said inlets.

* * * * *